Jan. 3, 1939.  A. R. SPICACCI  2,142,575
DIFFERENTIAL GEARING
Filed Sept. 29, 1936  3 Sheets-Sheet 1

INVENTOR:
ATTILIO R. SPICACCI,
BY Gales P. Moore
HIS ATTORNEY.

Jan. 3, 1939.  A. R. SPICACCI  2,142,575
DIFFERENTIAL GEARING
Filed Sept. 29, 1936  3 Sheets-Sheet 2
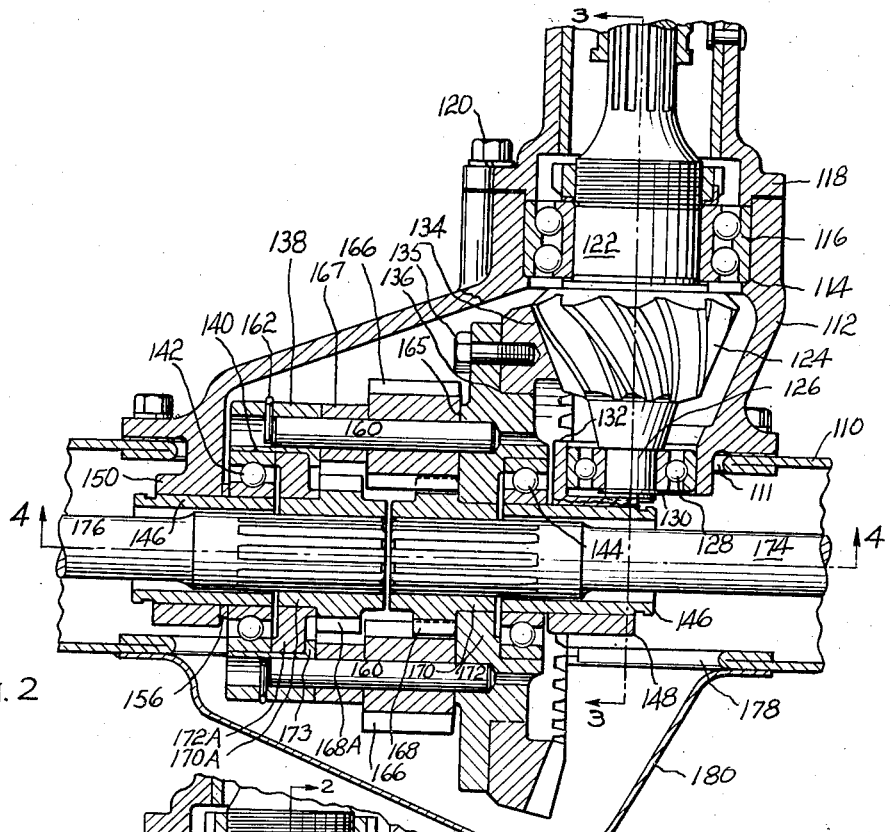
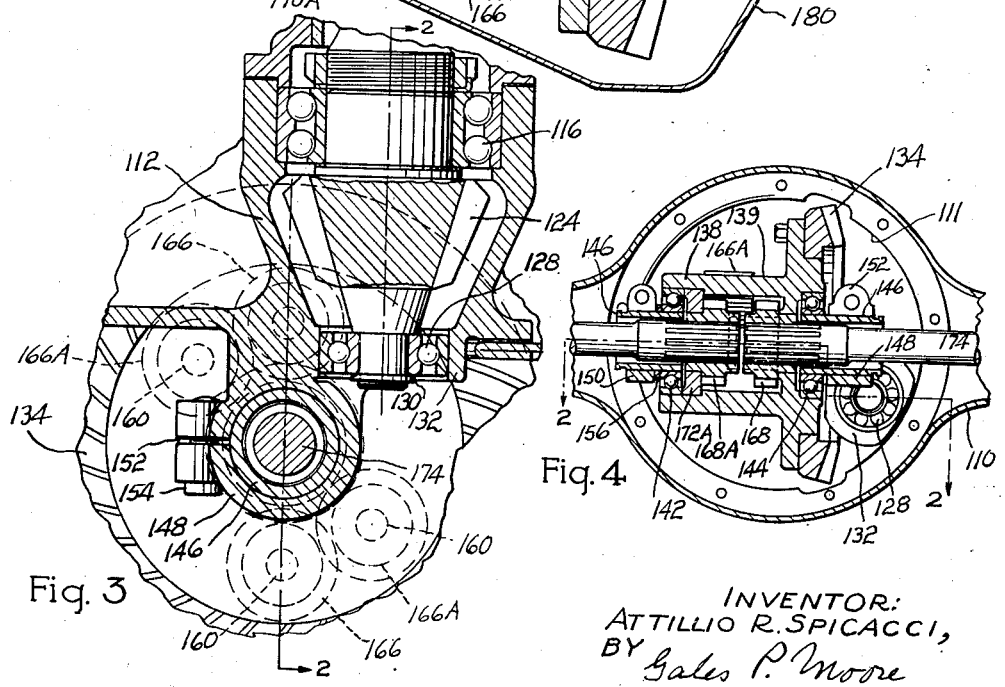
INVENTOR:
ATTILLIO R. SPICACCI,
BY Gales P. Moore
HIS ATTORNEY.

Jan. 3, 1939.  A. R. SPICACCI  2,142,575
DIFFERENTIAL GEARING
Filed Sept. 29, 1936  3 Sheets-Sheet 3
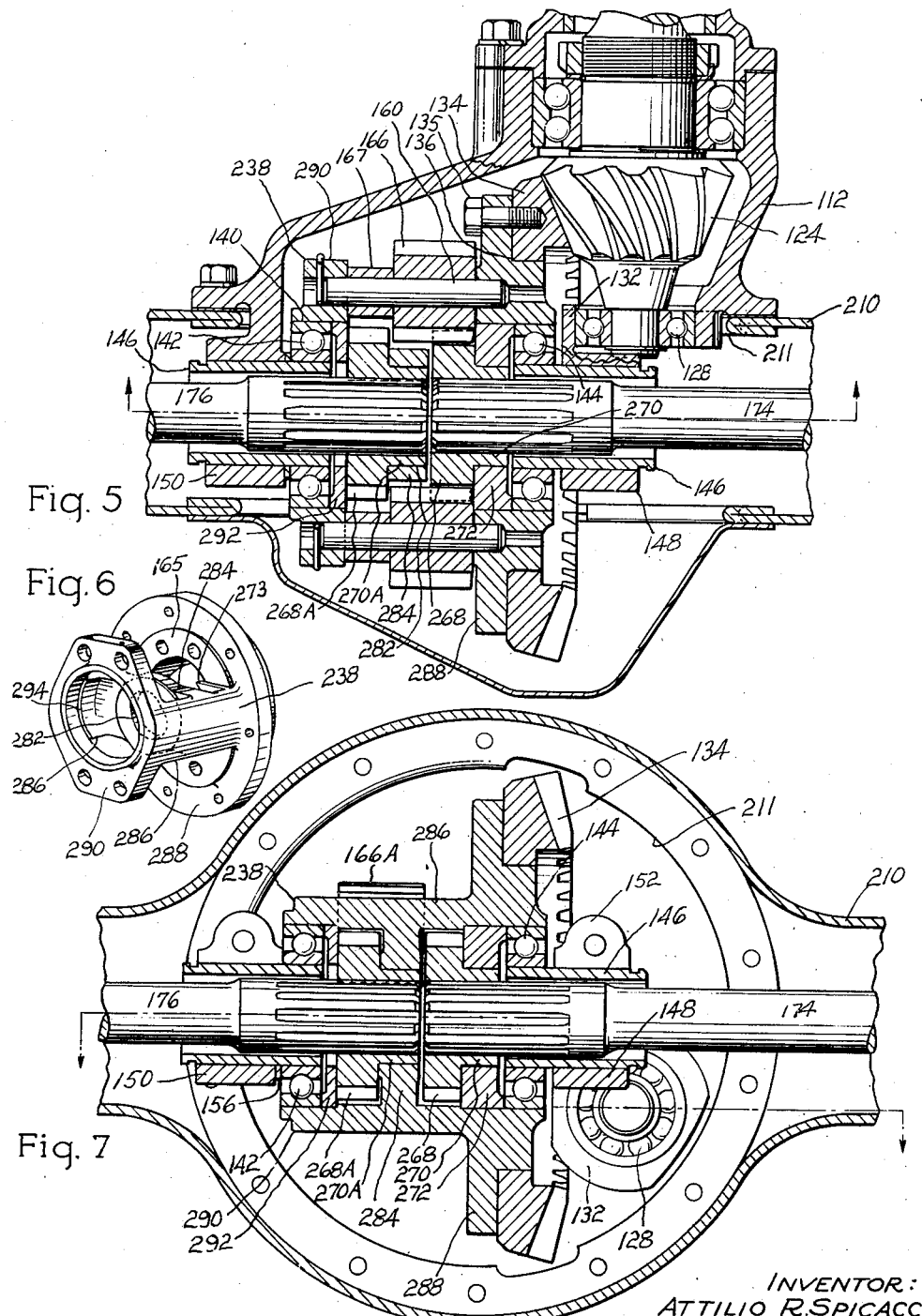
INVENTOR:
ATTILIO R. SPICACCI,
BY Gales P. Moore
HIS ATTORNEY.

Patented Jan. 3, 1939

2,142,575

UNITED STATES PATENT OFFICE 2,142,575

DIFFERENTIAL GEARING

Attilio R. Spicacci, Bristol, Conn., assignor to General Motors Corporation, Detroit, Mich., a corporation of Delaware Application September 29, 1936, Serial No. 103,134

17 Claims. (Cl. 74—312)

This invention relates to differential gearing and comprises all of the features of novelty herein disclosed. Due to the use of better materials, methods, mountings, etc., ring gears for differentials can be made of small diameter and yet satisfactorily transmit the high torque required. However, with a reduction in diameter of ring gears, greater rigidity in the driving pinion mounting is desirable yet it becomes increasingly difficult to use the desirable straddle mounting for the pinion shaft because of lack of room between the ring gear and the differential cage for the rear bearing especially with hypoid gearing. Hitherto, the diameter of the differential enclosing and supporting carrier in the plane of the ring gear has usually been the factor which determines road clearance but with smaller ring gears the size of the carrier in a plane transversely of the ring gear may become the limiting factor (if the housing opening is to be circular) because the axial length of the differential cage has not been decreased. Hence it is increasingly desirable to make the differential cage compact in the axial direction in order that full advantage may be taken of the increased road clearance made possible by smaller ring gears.

An object of the invention accordingly is to provide an improved straddle mounting for the pinion shaft of a differential, especially in combination with a ring gear of small diameter. Another object is to provide an improved differential cage of small axial length, especially in combination with a small ring gear in order that the enclosing differential carrier may be made small in diameter both lengthwise and transversely. Another object is to provide an improved differential carrier for supporting a differential cage and a pinion shaft, the mounting being applicable to conventional spiral gears or to the hypoid type. Another object is to provide an improved differential gearing of the spur gear type.

To these ends and also to improve generally upon devices of this character, the invention consists in the various matters hereinafter described and claimed. In its broader aspects, the invention is not necessarily limited to the specific constructions selected for illustrative purposes in the accompanying drawings in which Fig. 1 is a horizontal sectional view of a differential gearing, the pinion shaft and pinion being shown in elevation.

Fig. 2 is a sectional view of another embodiment of the invention, portions of the section being in parallel planes as indicated by the line 2—2 of Fig. 3.

Fig. 3 is a vertical sectional view on the line 3—3 of Fig. 2.

Fig. 4 is a vertical sectional view on the line 4—4 of Fig. 2.

Fig. 5 is a sectional view on the line 5—5 of Fig. 7 of another embodiment.

Fig. 6 is a perspective view of the differential cage shown in Fig. 5 with the gears omitted.

Fig. 7 is a vertical sectional view on the line 7—7 of Fig. 5.

Figure 1:
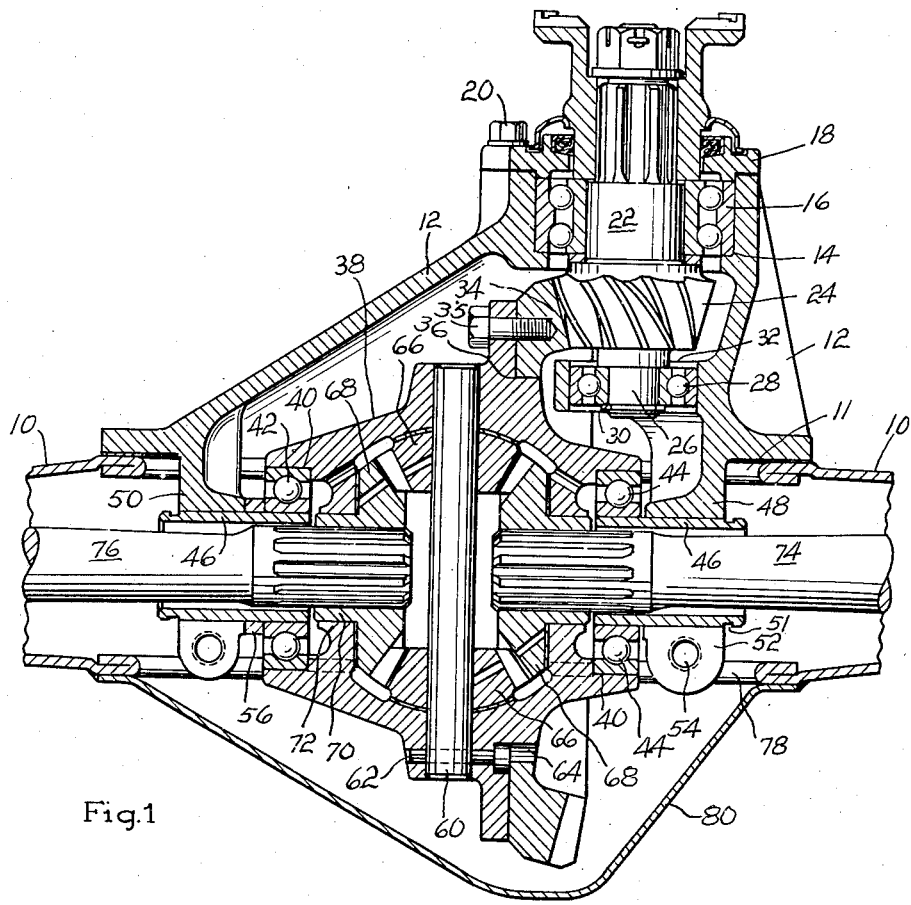

The numeral 10 in Fig. 1 indicates the usual rear axle housing having an opening 11 around which is detachably secured a forwardly projecting carrier 12 having a shouldered seat 14 for an antifriction bearing 16. The bearing is herein shown as a preloaded, double row, ball bearing whose outer race ring is clamped by a cap 18 secured to the carrier by bolts 20. A pinion shaft 22 having a spiral pinion 24 is clamped to the inner race ring of the bearing and has a rearwardly projecting pilot stud 26 journalled in a ball bearing 28 whose inner race ring is retained on the stud by a split ring 30 and whose outer race ring is slidably mounted in a ringlike projection 32 of the carrier 12. This rear straddle bearing 28 has its rolling elements substantially in the cone containing the gear teeth and so effectively resists displacement of the pinion shaft due to the gear load.

The teeth of the spiral pinion 24 mesh at a high angle with teeth on a ring gear 34 which engages a shouldered seat 36 of a differential cage 38. The cage diminishes in diameter towards its ends which are recessed to form shouldered seats 40 for antifriction bearings 42 and 44 herein shown as radial ball bearings. The inner race rings of the bearings are supported on centerless-ground sleeves 46 which are removably supported in openings of pedestals 48 and 50 which project rearwardly into the axle housing from the carrier 12. The sleeves 46 have grooves 51 to facilitate axial removal from the pedestals by a suitable pulling tool. The pedestals are slit at the rear as indicated at 52 and provided with bolt holes 54 so that the sleeves can be clamped firmly in position to support the bearings. The inner race ring of the bearing 44 has a free space between it and the pedestal 48 whereas a spacing sleeve or washer 56 of selected thickness is interposed between the inner race ring of the bearing 42 and the pedestal 50. The spacing washer is selected to locate the ring gear 34 in proper mesh with the spiral pinion 24 and it transmits the thrust load of the meshing gears to the pedestal 58. The load on the bearing 42 is chiefly radial because of the high angle of mesh of the gear teeth while the load on the other bearing 44 is wholly radial so that no thrust load is induced by this bearing 44 upon the bearing 42.

The differential cage 38 has a differential pin 60 which is retained in position by a headed locking pin 62 which passes through it. The head of the pin 62 is engaged by the ring gear to hold it in a recess of the cage 38, the cage having a half-round recess 64 which interrupts the gear seat 36 so that the pin can be inserted before the gear is seated. The usual planetary or bevel gears 66 are journaled on the differential pin 60 and mesh with bevel gears 68 which have projecting hubs 70 journalled in openings of internal flanges 72 of the cage. The gears 68 are splined to drive shafts 74 and 76, the shaft 74 being the longer because of the offsetting of the cage from the pinion shaft. The rear opening 78 of the axle 10 is closed by a cover 80 which is preferably welded.

From the foregoing, it will be seen that the ring gear 34 is on the same side of the differential pin 60 as the pinion 24 and that the differential cage 38 has been offset from its usual central position so that, even with a small diameter ring gear, there is ample room between the pinion 24 and the drive shaft 74 for the rear straddle bearing 28 and its supporting projection 32. In other words, all of the differential gears and the differential pin 60 lie well to one side of the axis of the pinion shaft so that their bulk and that of the cage parts surrounding them is not interposed between the pinion and the axle. This construction allows ring gears to be made smaller and increases road clearance. The construction of the carrier 12 is such that both straddle bearings have a more rigid support because the right hand side of the carrier casting extends substantially straight towards the axle and does not diverge as on the left side, this making for a carrier which is smaller and for a correspondingly smaller opening 11 in the axle 10.

Figs. 2, 3 and 4 illustrate a modification wherein the differential gearing and pinion mounting is still more compact and provides increased road clearance. Parts 110 to 130 inclusive correspond to parts 10 to 30, respectively, of Fig. 1 and need not be described in detail but it is to be noted that the pinion shaft is below axle level. It will be seen that this hypoid type of gearing is inapplicable to Fig. 1 because the projection 32 would interfere with the ring gear or the cage. The ring like projection 132 for supporting the bearing 128 is at the inner or rear end of the casting 112 and actually projects into the axle housing 110 where one side of it becomes a part of the differential pedestal 148 as best shown in Fig. 3. As shown in Figs. 2, 3 and 4, wherein Fig. 3 is a vertical section in the plane of line 3—3 of Fig. 2, the pedestal 148 is substantially wholly on the differential side of the axis of the pinion shaft and above said shaft and it projects rearwardly from the carrier substantially radially of the axle housing. The pedestal is braced by and itself braces the projection 132 which is below the pedestal and has a portion projecting into the housing beyond the pedestal and on the other side of the pinion shaft from the differential gear.

The ring gear 134 is of smaller diameter than ring gear 34 and is secured by screw bolts 135 to a seat 136 on a differential cage 138, this cage containing a spur gear differential and comprising side members 139 (Fig. 4) connecting ring-like end members. The cage has its opposite ends formed with internal seats 140 for radial ball bearings 142 and 144 which are supported by centerless-ground sleeves 146 carried in pedestals 148 and 150. The bearing 144 is preferably in the plane of the ring gear and is on the same side of the pinion shaft as the ring gear and the cage. The cage is offset axially so that it lies wholly to one side of the pinion bearing 128 and its support, thus allowing that bearing to be brought in very close to the sleeve 146 and the pedestal structure 148 and out of interfering relation with the ring gear. The placing of the pinion shaft below axle level helps this close approach and in a manner requires it. The pedestals are slit on the top as shown at 152 in Figs. 3 and 4 and are provided with clamping bolts 154 to secure the sleeves 146. A spacing washer 156 of selected thickness is interposed between the inner race ring of the bearing 142 and the adjacent pedestal 150 while the inner race ring of the other bearing 144 has a clearance with the pedestal 148.

The differential cage 138 is a one-piece casting and has two pairs of parallel longitudinal openings for pins 160 which are locked in the openings by cotter pins 162. One pair of opposite pins 160 rotatably supports a pair of wide spur gears 166 which are held against an annular face 165 by a spacing sleeve 167 so that gears 166 mesh on one half of their width with a gear 168 and on the other half with wide gears 166A. Gears 166A are similarly mounted on the other pair of pins 160 but are axially offset or staggered with respect to gears 166 so that they mesh on one half of their width with a gear 168A. The gear 168 has a hub or projection 170 journalled in an internal flange 172 of the cage. The other gear 168A has a similar hub or projection 170A which is journalled in a spacing washer 172A which is seated in the cage against an internal abutment flange 173, the washer 172A having a little abutment flange against which the outer race ring of the bearing 142 seats. The gear 168 is splined to a drive shaft 174 and the gear 168A is splined to a drive shaft 176. The rear opening 178 of the axle housing 110 is closed by a welded on cover 180.

From the foregoing, it will be seen that the entire differential cage is at one side of the rear straddle bearing 128 which is thus brought in close to the drive shafts. The ring gear 134 is smaller in diameter than the ring gear 34 of Fig. 1, and the pinion 124 and its mounting in the carrier 112 are closer to the axle housing. The differential cage 138, by virtue of spur gear construction, is smaller in maximum diameter than the cage 38 and it is also shorter in the axial direction. The opening 111 is smaller than the opening 11. All these features result in increased road clearance which depends partly on the diameter of the ring gear and partly on the diameter of the carrier 112 in the plane of the opening 111.

Figs. 5 to 7 illustrate a modification which gives great compactness to the differential mechanism and carrier especially in a direction lengthwise of the axle casing 210 whose opening 211 is even smaller than the opening 111 of Fig. 2. The differential cage 238 is made shorter axially and the bearings 142 and 144 are closer together. This is accomplished by taking advantage of the space between the gears 268 and 268A to support one of them. Gear 268 has a hub or projection 270 journalled in a spacing washer 272 which is seated in the cage between the outer race ring of the bearing 144 and a pair of abutments 273 (Fig. 6) which project inwardly at the sides of the cage past the annular face 165. The other gear 268A has a hub or projection 270A which is journalled in an opening 282 of a cross bar 284 which runs across the middle of the cage from side members 286 which connect ring-like end members 288 and 290. At the other side of the gear 268A is a thin spacing washer 292 which fits in the bearing seat 140 between the outer race ring of the bearing 142 and a pair of spaced abutments 294 (Fig. 6) on the side members 286.

From the foregoing, it will be apparent that the differential cage is shortened in the axial direction, chiefly because the gear 268A is supported by a cross bar 284 in the waste space between the gears. Thus the bearing 142 and its supporting sleeve 146 can be more closely approached to the companion bearing and support; the left side of the carrier 112 is nearer to the pinion shaft resulting in a smaller axle opening 211 and a carrier of smaller diameter at this opening.

I claim:

1. In apparatus of the character described, an axle housing, a differential cage having a ring gear at one end, a driving pinion having a supporting shaft projecting rearwardly beyond the pinion and into the axle housing, the shaft being below axle level, the cage being offset with respect to the shaft, a carrier secured to the axle housing and having pedestals projecting into the housing, bearings for rotatably supporting the cage from pedestals, one of the bearings being in the plane of the ring gear, and the carrier also having a projection below axle level and extended into the axle housing beyond the adjacent cage supporting bearing to provide a bearing support for the projecting end of the shaft; substantially as described.

2. In apparatus of the character described, an axle housing, a differential cage having a ring gear, a driving pinion having a supporting shaft projecting into the axle housing, the cage being offset with respect to the shaft, a differential carrier secured to the axle housing and having pedestals projecting into the housing, bearings for rotatably supporting the cage from the pedestals, and the carrier also having a portion projecting into the axle housing beyond the end of the cage and its adjacent supporting bearing to provide a bearing support for the projecting end of the shaft; substantially as described.

3. In apparatus of the character described, an axle housing, a differential cage having a ring gear, a driving pinion having a supporting shaft projecting rearwardly beyond the pinion, the entire cage being offset to one side of the shaft, the shaft and the pinion being below axle level, a differential carrier secured to the axle housing and having a pedestal projecting into the axle housing beyond the end of the cage, and a portion of the projecting pedestal itself forming a bearing support for the projecting end of the shaft; substantially as described.

4. In apparatus of the character described, an axle housing, a differential cage having a ring gear, a driving pinion having a supporting shaft, the cage being offset wholly to one side of the shaft, the pinion shaft projecting into the axle housing, and a differential carrier secured to the axle housing and having a portion projecting into the housing beyond the end of the cage to form a bearing support for the shaft; substantially as described.

5. In apparatus of the character described, a one-piece differential cage comprising spaced side members connecting a pair of ring-like end members, a differential gear having a hub journalled in one of the end members, a spacing washer mounted in the other end member and insertable axially therein, and a differential gear coaxial with the first mentioned gear and having its hub journalled in the spacing washer; substantially as described.

6. In apparatus of the character described, a differential cage comprising spaced side members connecting a pair of end members, a spacing washer fitting in one of the end members, and a cage supporting bearing in said one end member and having its outer race ring abutting against the spacing washer; substantially as described.

7. In apparatus of the character described, a differential cage comprising spaced side members connecting a pair of end members, a spacing washer fitting in one of the end members, a differential gear having a hub journalled in the spacing washer, and a cage supporting bearing fitting in said one end member and abutting against the spacing washer; substantially as described.

8. In apparatus of the character described, a differential cage comprising spaced side members connecting a pair of end members, a cross bar connecting the side members, a differential gear having a projection journalled in the cross bar, and a differential gear coaxial with the first mentioned gear and having a journal support in one of the end members; substantially as described.

9. In apparatus of the character described, a differential cage comprising end members and an intermediate cross bar, a washer fitting in one of the end members, differential gears on opposite sides of the cross bar, one of the gears being journalled in the washer and the other gear being journalled in the cross bar; substantially as described.

10. In apparatus of the character described, a differential cage having a cross bar and a ring-like end member, a washer fitting in the end member, an antifriction bearing fitting in the end member and engaging the washer, and a differential gear confined between the washer and the cross bar; substantially as described.

11. In apparatus of the character described, a differential cage having a ring-like end member and a cross bar, a differential gear journalled in the cross bar; a spacing washer fitting in the end member and bearing against the differential gear, and an antifriction bearing fitting in the end member against the spacing washer; substantially as described.

12. In apparatus of the character described, a differential cage having ring-like end members, abutments adjacent to the end members, spacing washers fitting in the end members against the abutments, and antifriction bearings fitting in the end members against the spacing washers; substantially as described.

13. In apparatus of the character described, an axle housing of the banjo type having an opening, a differential cage and a ring gear in the opening, a driving pinion having a supporting shaft projecting into the axle housing, the cage being offset wholly to one side of the shaft, a differential carrier secured to the axle housing and having a pedestal connected thereto and projecting into the axle housing beyond the adjacent end of the cage, a bearing supported by the pedestal to support the adjacent end of the cage, the carrier also having a portion connected thereto and projecting within the axle housing to provide a bearing support for the projecting end of the shaft, said bearing support being beyond the cage supporting bearing and bracing the pedestal while being itself braced by the pedestal; substantially as described.

14. In apparatus of the character described, an axle housing of the banjo type having an opening, a differential cage and a ring gear in the opening, a driving pinion having a supporting shaft projecting into the housing, the entire cage being offset to one side of the shaft, a differential carrier secured to the axle housing and having a pedestal projecting into the axle housing beyond the adjacent end of the cage, a bearing supported by the pedestal to support the adjacent end of the cage and arranged at the same side of the projecting shaft as the differential cage, the carrier having another portion projecting within the axle housing to form a bearing support for the projecting end of the shaft, said bearing support being beyond the end of the cage and its supporting bearing; substantially as described.

15. In apparatus of the character described, an axle housing of the banjo type having an opening, a differential cage and a ring gear in the opening, a driving pinion having a supporting shaft projecting rearwardly beyond the pinion into the axle housing and arranged below axle level, the entire cage being offset to one side of the shaft, a differential carrier secured to the axle housing and having a pedestal projecting into the axle housing beyond the adjacent end of the cage, a bearing supported by the pedestal to support the adjacent end of the cage, the carrier also having a projection to provide a bearing support for the projecting end of the pinion shaft, said projection being beyond the end of the cage supporting bearing and connected to the pedestal and the carrier; substantially as described.

16. In apparatus of the character described, an axle housing of the banjo type having an opening, a differential cage and a ring gear in the opening, a driving pinion having a supporting shaft projecting rearwardly beyond the pinion and into the axle housing, the entire cage being offset to one side of the shaft, a differential carrier secured to the axle housing and having a pedestal projecting into the axle housing beyond the adjacent end of the cage, a bearing supported by the pedestal to support the adjacent end of the cage and arranged substantially in the plane of the ring gear, the carrier also having a projection to provide a bearing support for the projecting end of the shaft, said projection being beyond the end of the cage supporting bearing and connected to the pedestal and the carrier; substantially as described.

17. In apparatus of the character described, an axle housing, a differential cage having a ring gear, a driving pinion having a supporting shaft projecting rearwardly into the axle housing, the shaft and the pinion being below axle level, a differential carrier secured to the axle housing and having a cage supporting pedestal projecting into the axle housing, the pedestal being connected to the carrier at a point above and on the differential side of the pinion shaft, the pedestal extending from the carrier substantially radially of the axle housing, a bearing support for the projecting end of the pinion shaft, said support having a portion projecting from the carrier into the axle housing beyond the projecting pedestal and connected to said pedestal for mutual bracing; substantially as described.

ATTILIO R. SPICACCI.